United States Patent
Chen

(10) Patent No.: US 11,619,342 B1
(45) Date of Patent: Apr. 4, 2023

(54) FAN, HOLDER AND SUPPORT LEG OF HOLDER

(71) Applicant: ShenZhen NanPiaoChen Industry Co., Ltd., Guangdong (CN)

(72) Inventor: Mainan Chen, Guangdong (CN)

(73) Assignee: ShenZhen NanPiaoChen Industry Co., Ltd., Shenzhen (CN)

( * ) Notice: Subject to any disclaimer, the term of this patent is extended or adjusted under 35 U.S.C. 154(b) by 0 days.

(21) Appl. No.: 17/840,496

(22) Filed: Jun. 14, 2022

(51) Int. Cl.
*F16M 11/00* (2006.01)
*F16M 11/24* (2006.01)
*F04D 29/60* (2006.01)

(52) U.S. Cl.
CPC ......... *F16M 11/247* (2013.01); *F04D 29/601* (2013.01); *F16M 2200/08* (2013.01)

(58) Field of Classification Search
CPC .. F16M 11/247; F16M 11/40; F16M 2200/08; F04D 29/601
See application file for complete search history.

(56) References Cited

U.S. PATENT DOCUMENTS

| | | | | |
|---|---|---|---|---|
| 2,637,233 A * | 5/1953 | Hoffman | ............... | B25B 23/00 81/448 |
| 5,150,710 A * | 9/1992 | Hall | ............... | G01R 33/28 324/318 |
| 5,842,670 A * | 12/1998 | Nigoghosian | ......... | A45D 20/12 248/910 |
| 7,011,279 B2 * | 3/2006 | Richter | ............... | F16M 11/40 248/274.1 |
| 7,226,026 B2 * | 6/2007 | Lin | ............... | F16B 47/00 248/205.8 |
| 7,712,712 B2 * | 5/2010 | Richter | ............... | B60R 11/02 248/205.5 |
| 8,070,434 B2 * | 12/2011 | Sun | ............... | F04D 29/601 415/214.1 |
| 9,016,658 B2 * | 4/2015 | Barnard | ............... | F16M 11/40 248/688 |
| D910,160 S * | 2/2021 | Hsu | ............... | D23/382 |
| D923,773 S * | 6/2021 | Wang | ............... | D23/382 |
| 2007/0170320 A1 * | 7/2007 | Sun | ............... | F04D 25/08 248/177.1 |
| 2009/0039213 A1 * | 2/2009 | Darrow | ............... | F16M 11/40 396/428 |
| 2013/0062490 A1 * | 3/2013 | Godber | ............... | F16M 13/022 248/274.1 |
| 2013/0134268 A1 * | 5/2013 | Wessells | ............... | F16M 11/16 248/157 |

(Continued)

*Primary Examiner* — Amy J. Sterling
(74) *Attorney, Agent, or Firm* — Dragon Sun Law Firm, PC; Jinggao Li; Nathaniel Perkins

(57) ABSTRACT

The present disclosure provides a fan, a holder and a support leg of a holder. The support leg includes a rotational seat; a reinforcing piece where one end of the reinforcing piece inserted into the rotational seat and the reinforcing piece is bendable; and a soft leg sleeve sleeved on the reinforcing piece. The reinforcing piece and the rotational seat of the support leg are integrally formed to ensure more stable connection; the assembly of the support leg can be completed simply by sleeving the leg sleeve on the reinforcing piece. In addition to normal supporting effect, the support leg can also be held by hand or wound on another support piece based on different scenarios, bringing flexible and rich functions.

14 Claims, 2 Drawing Sheets

(56) References Cited

U.S. PATENT DOCUMENTS

| | | | |
|---|---|---|---|
| 2014/0168890 A1* | 6/2014 | Barnard | G06F 1/1626 248/181.2 |
| 2017/0086314 A1* | 3/2017 | Simon | F16M 11/28 |
| 2018/0119876 A1* | 5/2018 | Smolinski | F16M 11/40 |
| 2018/0266625 A1* | 9/2018 | Balmer | F16M 13/00 |

* cited by examiner

FAN, HOLDER AND SUPPORT LEG OF HOLDER

TECHNICAL FIELD

The present disclosure relates to the field of electronic products and in particular to a fan, a holder and a support leg of a holder.

BACKGROUND

A small portable fan is usually held by hand or supported with a holder or the like on a desktop. A support leg of the holder is typically a hard support or bendable leg.

The bendable support leg is usually formed by a bendable support rod or may further include a rod sleeve sleeved on the support rod and a rotational seat sleeved on an end of the support rod extending out of the rod sleeve. The support rod is usually flat to prevent any relative rotation. The leg of such structure is tedious to assemble because the support rod must be inserted into the rod sleeve and the rotational seat, leading to a lower efficiency.

SUMMARY

In order to solve the technical problem of the above tedious assembly in the prior art, the present disclosure provides a fan, a holder and a support leg of a holder.

The technical solution adopted by the present disclosure for solving the technical problems is described below: provided is a support leg of a holder, and the support leg includes a rotational seat; a reinforcing piece where one end of the reinforcing piece inserted into the rotational seat and the reinforcing piece is bendable; and a soft leg sleeve sleeved on the reinforcing piece.

Preferably, the rotational seat includes a spherical rotational body and rotational shafts extending from both sides of the rotational body.

Preferably, the end of the reinforcing piece inserted into the rotational seat is provided with an anti-slip thread.

Preferably, the rotational seat further includes a support section extending along the reinforcing piece and the support section is inserted into an end of the leg sleeve close to the rotational seat.

There is provided a holder, including a support base and at least two support legs, where the rotational seat of each support leg is in rotatable cooperation with the support base.

Preferably, the support base includes a base and a lower cover.

A lower side of the base is provided with an inwardly-recessed counter bore and an opening corresponding in position to the counter bore is disposed on the lower cover. The lower cover is mounted at the lower side of the base to enable the counter bore and the opening to form a rotational position for the rotational seat to be rotatably mounted.

Preferably, a rotational hole for the rotational shaft of the rotational seat to rotate is formed between inner sides of the counter bore and the opening.

Preferably, the holder includes three support legs in rotatable cooperation with the support base.

There is provided a fan, including a fan body and the holder, where the fan body is mounted on the support base of the holder.

The implementations of the fan, the holder and the support leg of the holder in the present disclosure have the following beneficial effects: the reinforcing piece and the rotational seat of the support leg are integrally formed to ensure more stable connection; the assembly of the support leg can be simply completed by sleeving the leg sleeve on the reinforcing piece. In addition to normal supporting effect, the support leg can also be held by hand or wound on another support piece based on different scenarios, bringing flexible and rich functions.

BRIEF DESCRIPTIONS OF THE DRAWINGS

The present disclosure will be further described below in combination with drawings and embodiments.

DETAILED DESCRIPTIONS OF EMBODIMENTS

In order to more clearly understand the technical features, the purposes and effects of the present disclosure, the specific embodiments of the present disclosure are described with reference to the drawings.

Figure 1:
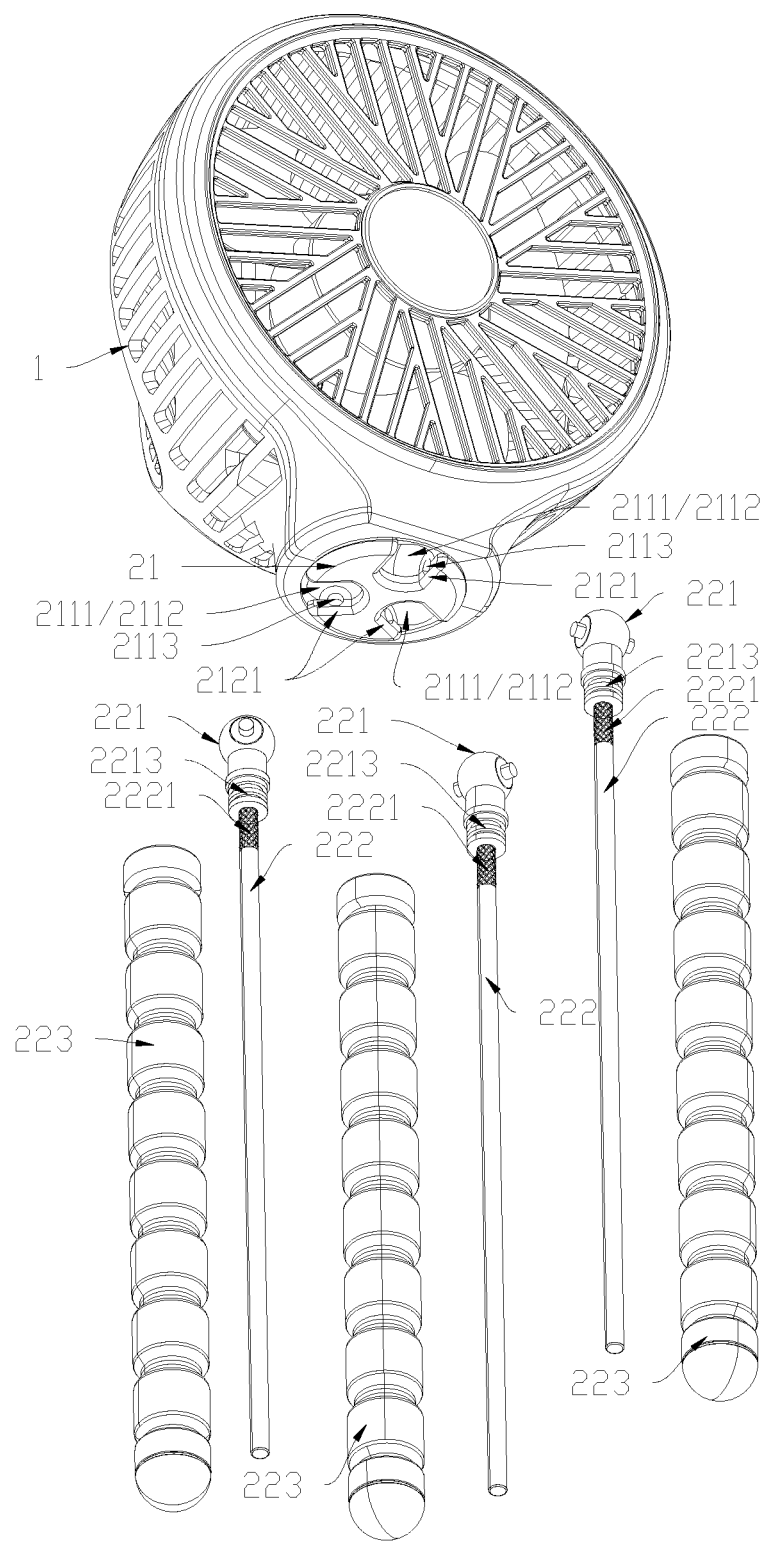
FIG. 1 is a schematic diagram illustrating a breakdown structure of a fan body and a holder of a fan according to an embodiment of the present disclosure.
Figure 2:
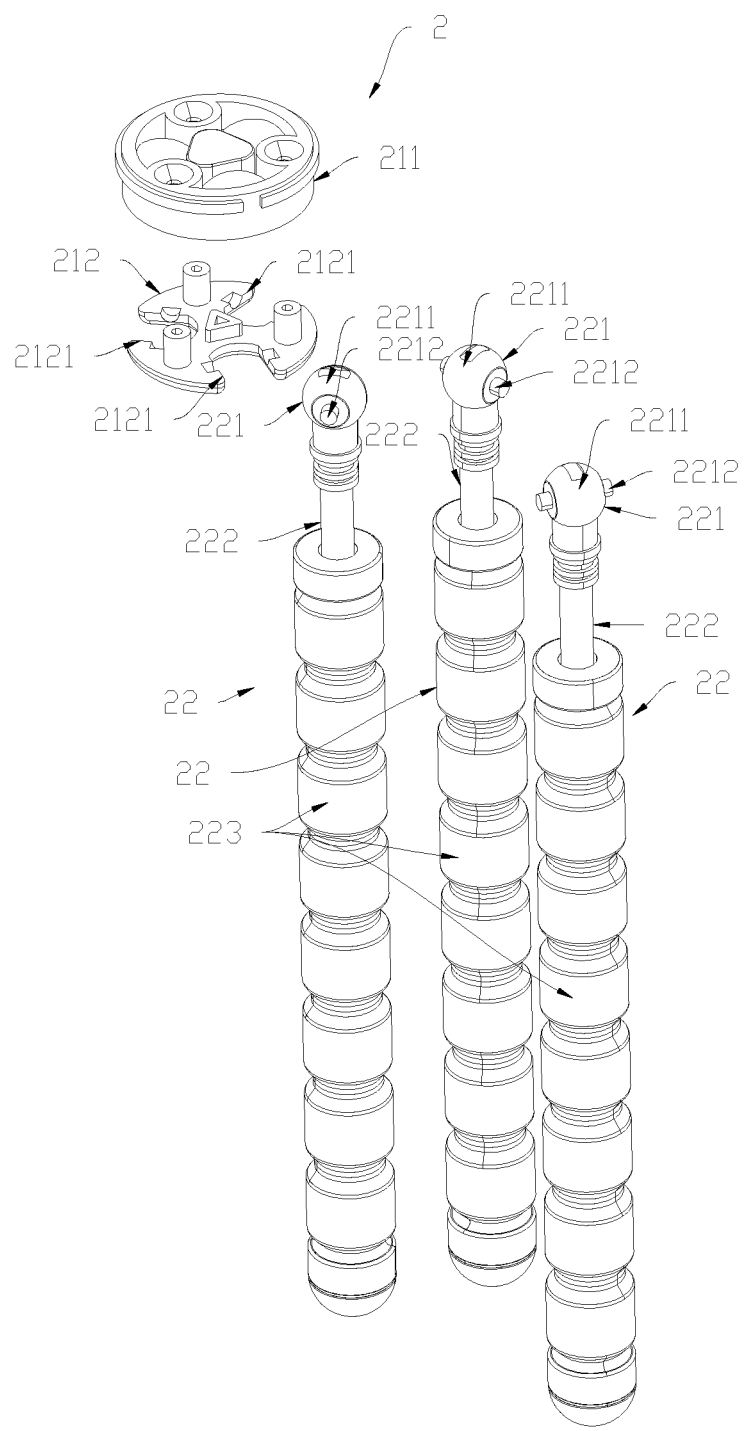
FIG. 2 is a schematic diagram illustrating a breakdown structure of the holder in FIG. 1.

As shown in FIGS. 1 and 2, a preferred embodiment of the present disclosure provides a fan including a fan body 1 and a holder 2, where the fan body 1 is mounted on a support base 21 of the holder 2. The fan body 1 includes a power supply and a fan blade rotatably disposed, where the fan blades blow air under the drive of the power supply.

The holder 2 includes the support base 21 and three support legs 22, and a rotational seat 221 of each support leg 22 is in rotatable cooperation with the support base 21.

Furthermore, the support leg 22 includes the rotational seat 221; a reinforcing piece 222 where one end of the reinforcing piece 222 inserted into the rotational seat 221 and the reinforcing piece 222 is bendable; and a soft leg sleeve 223 sleeved on the reinforcing piece 222.

The reinforcing piece 222 and the rotational seat 221 of the support leg 22 are integrally formed to ensure more stable connection; the assembly of the support leg 22 can be simply completed by sleeving the leg sleeve 223 on the reinforcing piece 222. In addition to normal supporting effect, the support leg 22 can also be held by hand or wound on another support piece based on different scenarios, bringing flexible and rich functions.

Furthermore, the rotational seat 221 includes a spherical rotational body 2211 and rotational shafts 2212 extending from both sides of the rotational body 2211. The rotational seat 221 rotates around the rotational shafts 2212 during rotation.

Preferably, the end of the reinforcing piece 222 inserted into the rotational seat 221 is provided with an anti-slip thread 2221 to ensure stability of the connection between the reinforcing piece 222 and the rotational seat 221.

Furthermore, in order to improve the connection sealing between the rotational seat 221 and the leg sleeve 223 and prevent the reinforcing piece 222 from being exposed, the rotational seat 221 may further include a support section 2213 extending along the reinforcing piece 222, and the support section 2213 is inserted into an end of the leg sleeve 223 close to the rotational seat 221.

In some embodiments, the support base 21 includes a base 211 and a lower cover 212. A lower side of the base 211 is provided with an inwardly-recessed counter bore 2111 and an opening 2121 corresponding in position to the counter bore 2111 is disposed on the lower cover 212. The lower cover 212 is mounted at the lower side of the base 211 to enable the counter bore 2111 and the opening 2121 to form a rotational position 2112 for the rotational seat 221 to be rotatably mounted.

Furthermore, a rotational hole 2113 for the rotational shaft 2212 of the rotational seat 221 to rotate is formed between inner sides of the counter bore 2111 and the opening 2121 to ensure the rotational direction stability of the support leg 22.

In this embodiment, the holder 2 includes three support legs 22 in rotatable cooperation with the support base 21 to form a stable support for the fan body 1.

It can be understood that the above technical features can be combined arbitrarily for use without limitation.

The above are only embodiments of the present disclosure and are not used to limit the scope of protection of the present disclosure. Any equivalent structures or equivalent flow transformation made by using the descriptions and the drawings of the present disclosure or direct or indirect application to other relevant technical fields can be incorporated in the scope of protection of the present disclosure.

What is claimed is:

1. A support leg of a holder, comprising:
   a rotational seat (221) comprising a spherical rotational body (2211) and two rotational coaxial shafts (2212) extending from two sides of the spherical rotational body (2211), wherein the two rotational coaxial shafts (2212) are configured be inserted into two holes (2113) for the spherical rotational body (2211) to rotate along the two rotational coaxial shafts (2212);
   a reinforcing piece (222), wherein one end of the reinforcing piece (222) inserted into the rotational seat (221) is provided with an anti-slip thread (2221) to ensure stability of a connection between the reinforcing pieces (222) and the rotational seat (221); and the reinforcing piece (222) is bendable; and
   a leg sleeve (223) sleeved on the reinforcing piece (222), wherein the support leg of the holder is configured to support a fan body through the holder.

2. The support leg (22) of claim 1, wherein the rotational seat (221) further comprises a support section (2213) extending along the reinforcing piece (222) followed by the anti-slip thread (2221) and connects the spherical rotational body (2211) to the anti-slip thread and the support section (2213) is inserted into an end of the leg sleeve (223) close to the rotational seat (221).

3. A holder (2), comprising:
   a support base (21) and at least two support legs (22) according to claim 2, wherein the rotational seat (221) of each support leg (22) is in rotatable cooperation with the support base (21).

4. The holder (2) of claim 3, wherein the support base (21) comprises a base (211) and a lower cover (212);

a lower side of the base (211) is provided with a inwardly-recessed counter bore (2111) and an opening (2121) corresponding in position to the counter bore (2111) is disposed on the lower cover (212), the lower cover (212) is mounted at the lower side of the base (211) to enable the counter bore (2111) and the opening (2121) to form a rotational position (2112) for the rotational seat (221) to be rotatably mounted.

5. The holder (2) of claim 4, wherein the two holes (2113) for the two rotational shafts (2212) of the rotational seat (221) to rotate are formed between inner sides of the counter bore (2111) and the opening (2121).

6. The holder (2) of claim 3, wherein the holder (2) comprises three support legs (22) in rotatable cooperation with the support base (21).

7. A fan, comprising a fan body (1) and the holder (2) according to claim 3, wherein the fan body (1) is mounted on the support base (21) of the holder (2).

8. The holder (2), comprising the support base (21) and at least two support legs (22) according to claim 3.

9. The holder (2), comprising the support base (21) and at least two support legs (22) according to claim 3, wherein the end of the reinforcing piece (222) inserted into the rotational seat (221) is provided with the anti-slip thread (2221).

10. The holder (2), comprising the support base (21) and at least two support legs (22) according to claim 3, wherein the rotational seat (221) further comprises the support section (2213) extending along the reinforcing piece (222) and the support section (2213) is inserted into the end of the leg sleeve (223) close to the rotational seat (221).

11. The holder (2) of claim 4, wherein the holder (2) comprises three support legs (22) in rotatable cooperation with the support base (21).

12. The holder (2) of claim 5, wherein the holder (2) comprises three support legs (22) in rotatable cooperation with the support base (21).

13. The fan, comprising the fan body (1) and the holder (2) according to claim 7, wherein the support base (21) comprises the base (211) and the lower cover (212);
   the lower side of the base (211) is provided with the inwardly-recessed counter bore (2111) and the opening (2121) corresponding in position to the counter bore (2111) is disposed on the lower cover (212), the lower cover (212) is mounted at the lower side of the base (211) to enable the counter bore (2111) and the opening (2121) to form a rotational position (2112) for the rotational seat (221) to be rotatably mounted.

14. The fan, comprising the fan body (1) and the holder (2) according to claim 13, wherein the two holes (2113) for the two rotational shafts (2212) of the rotational seat (221) to rotate are formed between inner sides of the counter bore (2111) and the opening (2121).

* * * * *

(12) EX PARTE REEXAMINATION CERTIFICATE (12874th)
United States Patent
Chen

(10) Number: US 11,619,342 C1
(45) Certificate Issued: Mar. 26, 2025

(54) FAN, HOLDER AND SUPPORT LEG OF HOLDER

(71) Applicant: ShenZhen NanPiaoChen Industry Co., Ltd., Guangdong (CN)

(72) Inventor: Mainan Chen, Guangdong (CN)

(73) Assignee: SHENZHEN NANPIAOCHEN INDUSTRY CO., LTD., Guangdong (CN)

Reexamination Request:
No. 90/019,501, May 1, 2024

Reexamination Certificate for:
Patent No.: 11,619,342
Issued: Apr. 4, 2023
Appl. No.: 17/840,496
Filed: Jun. 14, 2022

(51) Int. Cl.
*F16M 11/24* (2006.01)
*F04D 29/60* (2006.01)

(52) U.S. Cl.
CPC ......... *F16M 11/247* (2013.01); *F04D 29/601* (2013.01); *F16M 2200/08* (2013.01)

(58) Field of Classification Search
None
See application file for complete search history.

(56) References Cited

To view the complete listing of prior art documents cited during the proceeding for Reexamination Control Number 90/019,501, please refer to the USPTO's Patent Electronic System.

*Primary Examiner* — Matthew J Kasztejna

(57) ABSTRACT

The present disclosure provides a fan, a holder and a support leg of a holder. The support leg includes a rotational seat; a reinforcing piece where one end of the reinforcing piece inserted into the rotational seat and the reinforcing piece is bendable; and a soft leg sleeve sleeved on the reinforcing piece. The reinforcing piece and the rotational seat of the support leg are integrally formed to ensure more stable connection; the assembly of the support leg can be completed simply by sleeving the leg sleeve on the reinforcing piece. In addition to normal supporting effect, the support leg can also be held by hand or wound on another support piece based on different scenarios, bringing flexible and rich functions.

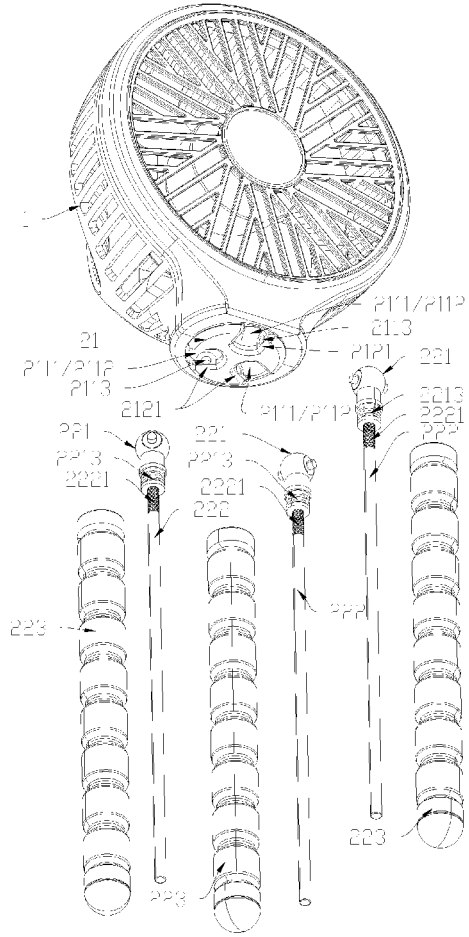

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-14 are cancelled.

* * * * *